(12) United States Patent
Kim et al.

(10) Patent No.: US 8,411,133 B2
(45) Date of Patent: Apr. 2, 2013

(54) MOBILE TERMINAL AND PANORAMIC PHOTOGRAPHING METHOD FOR THE SAME

(75) Inventors: Nam Jin Kim, Suwon-si (KR); Seung Hyun Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 997 days.

(21) Appl. No.: 12/211,604

(22) Filed: Sep. 16, 2008

(65) Prior Publication Data
US 2009/0115840 A1    May 7, 2009

(30) Foreign Application Priority Data
Nov. 2, 2007    (KR) .............................. 2007-0111571

(51) Int. Cl.
*H04N 7/00* (2006.01)

(52) U.S. Cl. ............... 348/36; 348/37; 348/E13.069; 348/E13.064; 382/164; 382/293; 382/295

(58) Field of Classification Search ............ 348/51, 348/E13.069, E13.064, 36–37; 382/164, 382/293, 295
See application file for complete search history.

(56) References Cited

U.S. PATENT DOCUMENTS

| | | | | |
|---|---|---|---|---|
| 6,314,211 B1* | 11/2001 | Kim et al. | ....................... | 382/285 |
| 6,377,623 B1* | 4/2002 | Ra et al. | .................... | 375/240 |
| 6,430,223 B1* | 8/2002 | Lim | .................... | 375/240.16 |
| 6,885,392 B1* | 4/2005 | Mancuso et al. | ................ | 348/36 |
| 6,906,743 B1* | 6/2005 | Maurer | ........................ | 348/180 |
| 6,993,077 B2* | 1/2006 | Lee | ........................... | 375/240.16 |
| 7,260,148 B2* | 8/2007 | Sohm | ....................... | 375/240.16 |
| 7,302,015 B2* | 11/2007 | Kim et al. | ..................... | 375/327 |
| 7,986,854 B2* | 7/2011 | Kim et al. | ..................... | 382/275 |
| 8,115,801 B2* | 2/2012 | Mei et al. | ........................ | 348/36 |
| 8,164,641 B2* | 4/2012 | Kawakatsu et al. | ......... | 348/218.1 |
| 8,243,790 B2* | 8/2012 | Leontaris et al. | ......... | 375/240.02 |
| 2002/0034318 A1* | 3/2002 | Sim | .............................. | 382/107 |
| 2002/0113901 A1* | 8/2002 | Osberger | ...................... | 348/699 |
| 2003/0095197 A1* | 5/2003 | Wheeler et al. | ............... | 348/241 |
| 2004/0001147 A1* | 1/2004 | Vella et al. | .............. | 348/208.99 |
| 2004/0189849 A1* | 9/2004 | Hofer | ....................... | 348/333.03 |
| 2004/0257436 A1* | 12/2004 | Koyanagi et al. | ............... | 348/36 |
| 2005/0110875 A1* | 5/2005 | Ma et al. | ..................... | 348/208.1 |
| 2005/0139944 A1* | 6/2005 | Lin et al. | ........................ | 257/432 |
| 2005/0249288 A1* | 11/2005 | Ha | ............................ | 375/240.16 |
| 2005/0271298 A1* | 12/2005 | Yu | ............................... | 382/286 |
| 2006/0023788 A1* | 2/2006 | Otsuka et al. | ............. | 375/240.16 |
| 2006/0029272 A1* | 2/2006 | Ogawa | .......................... | 382/154 |
| 2006/0139458 A1* | 6/2006 | Chou | .......................... | 348/208.1 |
| 2007/0098067 A1* | 5/2007 | Kim et al. | ................. | 375/240.08 |
| 2007/0115351 A1* | 5/2007 | McCormack | .................... | 348/36 |
| 2007/0120972 A1* | 5/2007 | Kim et al. | ....................... | 348/51 |
| 2007/0126921 A1* | 6/2007 | Gallagher et al. | ............. | 348/362 |
| 2007/0286287 A1* | 12/2007 | Kim et al. | ................. | 375/240.16 |
| 2007/0286497 A1* | 12/2007 | Podilchuk | ..................... | 382/218 |
| 2008/0074489 A1* | 3/2008 | Zhang et al. | .................... | 348/36 |

(Continued)

*Primary Examiner* — Alina N. Boutah
(74) *Attorney, Agent, or Firm* — Jefferson IP Law LLP

(57) ABSTRACT

A mobile terminal and panoramic photographing method for the same are provided. The panoramic photographing method includes displaying a preview image upon selection of a panoramic mode, successively capturing a first partial image and second partial image in response to input of a shooting start signal, setting a photographing direction through a comparison between the first partial image and second partial image, and producing a panoramic image in the set photographing direction. As a result, the user does not have to set the photographing direction to capture a panoramic image using a mobile terminal.

16 Claims, 4 Drawing Sheets

U.S. PATENT DOCUMENTS

| | | | |
|---|---|---|---|
| 2008/0074506 A1* | 3/2008 | Oh et al. | 348/218.1 |
| 2008/0117968 A1* | 5/2008 | Wang | 375/240.12 |
| 2008/0158341 A1* | 7/2008 | Gelsomini et al. | 348/36 |
| 2008/0192125 A1* | 8/2008 | Kang et al. | 348/222.1 |
| 2008/0278633 A1* | 11/2008 | Tsoupko-Sitnikov et al. | 348/699 |
| 2009/0086816 A1* | 4/2009 | Leontaris et al. | 375/240.03 |
| 2010/0142759 A1* | 6/2010 | Ridley et al. | 382/107 |
| 2011/0043604 A1* | 2/2011 | Peleg et al. | 348/36 |
| 2012/0038776 A1* | 2/2012 | Ahiska et al. | 348/159 |

* cited by examiner

MOBILE TERMINAL AND PANORAMIC PHOTOGRAPHING METHOD FOR THE SAME

PRIORITY

This application claims the benefit under 35 U.S.C. §119 (a) of a Korean patent application filed in the Korean Intellectual Property Office on Nov. 2, 2007 and assigned Serial No. 2007-0111571, the entire disclosure of which is hereby incorporated by reference.

BACKGROUND OF THE INVENTION

1. Field of the Invention

The present invention relates generally to a mobile terminal. More particularly, the present invention relates to a mobile terminal and panoramic photographing method for the same that enable a user to capture a panoramic photograph including multiple images.

2. Description of the Related Art

Modern mobile terminals enable users to make a voice call and include various functions related to video calls, messages, MP3 audio, and cameras. In particular, mobile terminals having a camera module enable users to take desired images at most times and places.

The user of a mobile terminal with a camera module can take various pictures from a small photograph to a moving image usable in an Internet page. More particularly, a panoramic image having a wider field of view than a standard image is an image produced by joining multiple pictures together that were taken along a desired direction.

However, to take a panoramic image, a user must set a photographing direction in advance. Therefore, the user is inconvenienced by having to pre-set a photographing direction, such as 'up', 'down', 'left' and 'right' before taking the panoramic image.

Therefore, a need exists for an improved mobile terminal and panoramic photographing method for the same that enable a user to take a panoramic photograph including multiple images.

SUMMARY OF THE INVENTION

An aspect of the present invention is to address the above-mentioned problems and/or disadvantages and to provide at least the advantages described below. Accordingly, an aspect of the present invention is to provide a mobile terminal and panoramic photographing method for the same that automatically sets a photographing direction in a panoramic mode through a comparison between input frames.

In accordance with an aspect of the present invention, a method for panoramic photographing in a mobile terminal is provided. The method includes displaying, upon selection of a panoramic mode, a preview image, successively capturing, in response to an input of a shooting start signal, a first partial image and second partial image, setting a photographing direction through a comparison between the first partial image and second partial image, and producing a panoramic image in the set photographing direction.

In accordance with an aspect of the present invention, a mobile terminal for panoramic photographing is provided. The terminal includes a camera unit for taking partial images, a display unit for displaying a panoramic image including the partial images taken, and a control unit for controlling, during a panoramic mode, the camera unit to capture a first partial image and second partial image, for determining a photographing direction through a comparison between the first partial image and second partial image, for producing a panoramic image in the determined photographing direction, and for controlling the display unit to display the produced panoramic image.

In accordance with an aspect of the present invention, during a panoramic mode for panoramic photographing, when frames are successively captured by a camera unit, a reference block and comparison blocks are set in the successive frames and pixel brightness values of the reference block are compared to those of the comparison blocks to determine the photographing direction. Thus, the user does not have to set the photographing direction in advance to take a panoramic image.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description, the term 'mobile terminal' refers to a communication terminal that may be carried by a user. The mobile terminal may be used to create data and to send and receive data to and from another terminal. Further, the mobile terminal includes a small camera.

The term 'partial image' refers to one of multiple frames for forming a panoramic image.

Figure 1:
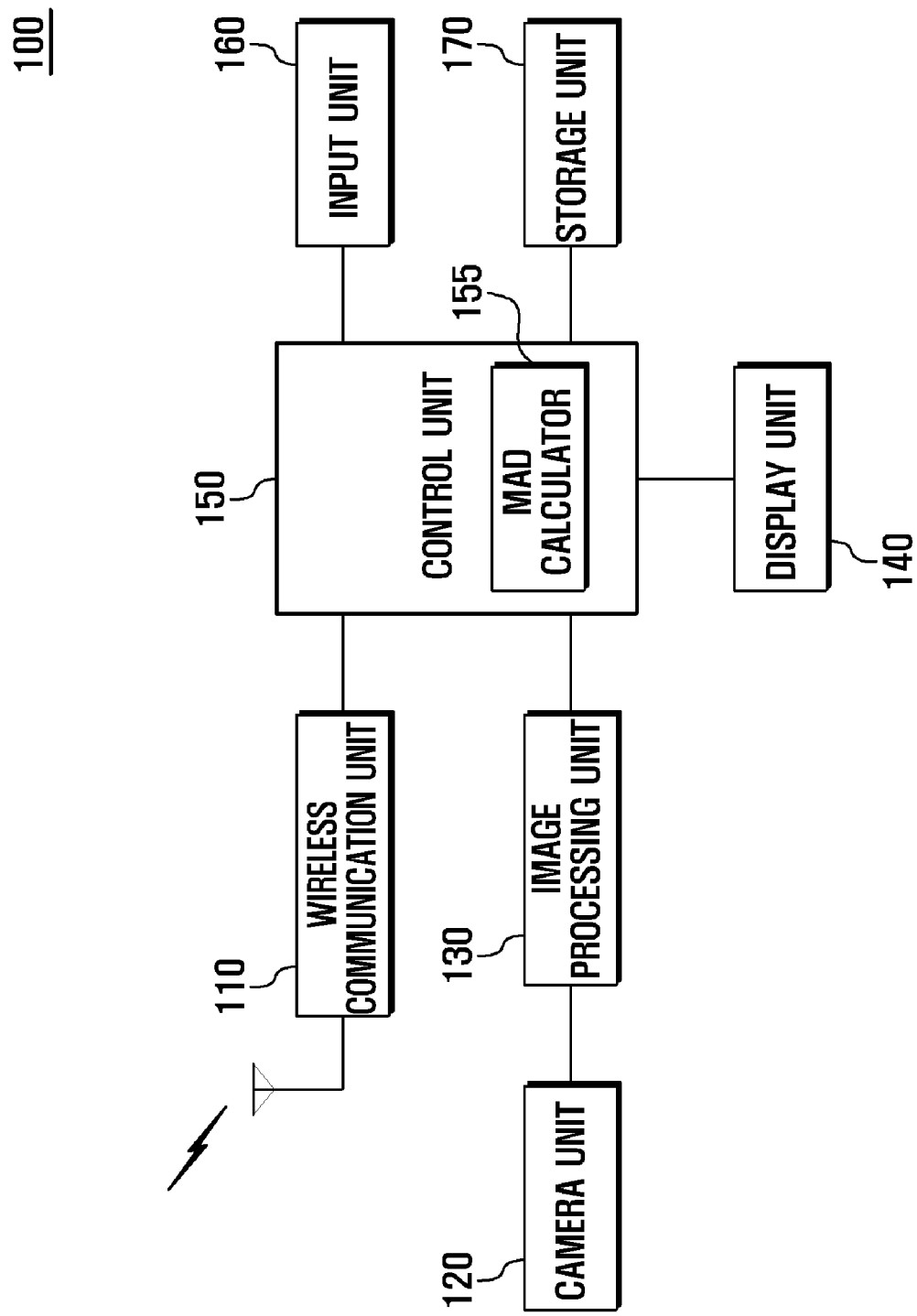
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, the mobile terminal 100 includes a wireless communication unit 110, a camera unit 120, an image processing unit 130, a display unit 140, a control unit 150, an input unit 160 and a storage unit 170.

The wireless communication unit 110 communicates with a base station to perform communications for the mobile terminal. The wireless communication unit 110 may include a duplexer (not shown) for separating transmitting and receiving frequencies from each other, a transmitter (not shown) for upconverting the frequency of a signal to be transmitted, and a receiver (not shown) for downconverting the frequency of a received signal.

The camera unit 120 may capture an image by photographing a target object. The camera unit 120 includes a lens for forming an image, an image sensor for converting an optical signal corresponding to the formed image into an analog electrical signal, and a signal processor for converting the analog electrical signal from the image sensor into digital data. The image sensor may be a Charge-Coupled Device (CCD) sensor or the like, and the signal processor may be a Digital Signal Processor (DSP) or the like. The image sensor and signal processor may be realized as separate units or as a single unit. In a panoramic mode, the camera unit 120 may take multiple partial images for forming a panoramic image.

The image processing unit 130 generates screen data to display an image signal from the camera unit 120. The image processing unit 130 may process the image signal by units of frames and output frame image data corresponding to the size of the display unit 140. The image processing unit 130 may include a video codec for compressing frame image data to be displayed on the display unit 140 in a preset format, and for decompressing compressed frame image data into the original frame image data. The video codec may be at least one of a Joint Photographic Experts Group (JPEG) codec, Moving Picture Experts Group 4 (MPEG-4) codec, wavelet codec and the like.

The display unit 140 may display various information related to states and operations of the mobile terminal, and, more particularly, the frame image data from the image processing unit 130. The display unit 140 may include a panel of Liquid Crystal Display (LCD) devices, an LCD controller for controlling the LCD devices, and a video memory for storing video data, and may be realized in a touch screen. If realized as a touch screen, the display unit 140 can also act as input unit 160 or as an additional input unit. The display unit 140 can display a panoramic image taken by the camera unit 120.

The control unit 150 controls the overall states and operations of the mobile terminal. The control unit 150 may include a data processing module, which includes a transmitter for encoding and for modulating a signal to be transmitted and a receiver for demodulating and decode a received signal. The data processing module may include a modulator/demodulator (modem) and a coder/decoder (codec). The codec includes a data codec for processing packet data, and an audio codec for processing an audio signal such as a voice signal.

In an exemplary implementation, the control unit 150 may include a Mean Absolute Difference (MAD) calculator 155 to set a photographing direction through block matching for taking a panoramic image. In the block matching, fixed-size blocks are set in successive images. MAD values of candidate directions are computed using brightness values of pixels in the blocks and the photographing direction is determined to a candidate direction with the smallest MAD value.

To be more specific, the MAD calculator 155 sets a reference block on a first one of successive input images, sets comparison blocks (macroblocks of 16*16 pixels) on a next input image with reference to the reference block set on the first input image, and computes the MAD values of the comparison blocks using brightness values of pixels in the reference block and the comparison blocks.

The MAD value can be computed using Equation 1.

$$MAD(dx, dy) = \frac{1}{mn}\sum_{i=0}^{m}\sum_{j=0}^{n} |F(i, j) - G(i+dx, j+dy)|, \quad \text{[Equation 1]}$$

where mn is the size of the block, F(i,j) denotes brightness values of pixels in the reference block, and G(i+dx, j+dy) denotes brightness values of pixels in the comparison blocks.

Figure 2A:
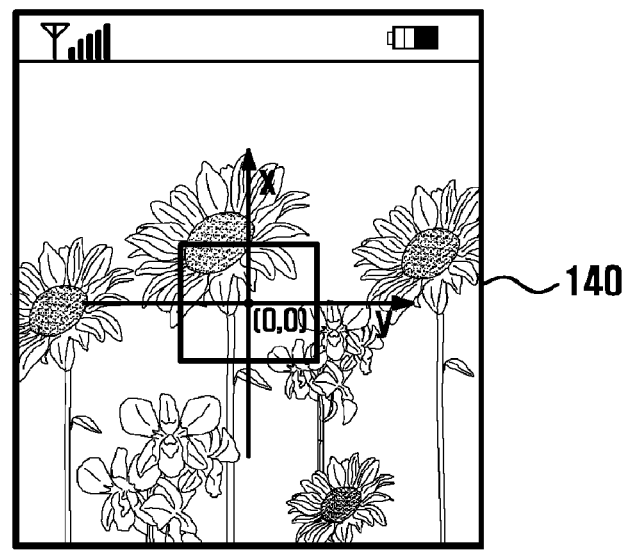
FIGS. 2A and 2B are screen representations for a reference block and comparison blocks set in successive partial images according to an exemplary embodiment of the present invention.
Figure 2B:
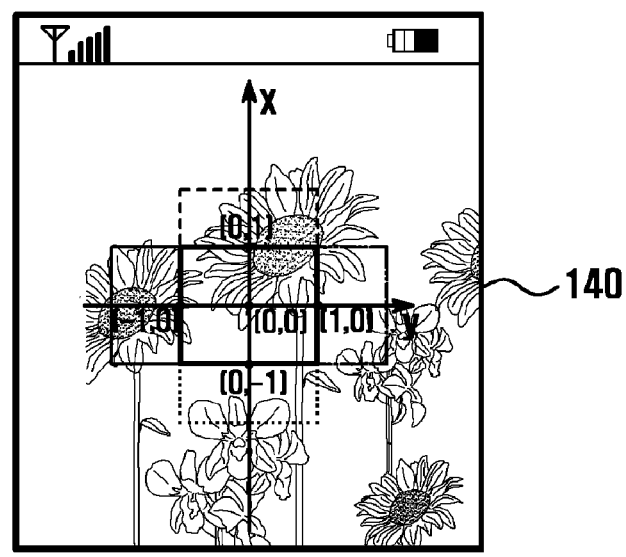

After computation of the MAD values of the comparison blocks, the control unit 150 determines the smallest one of the MAD values, and sets the photographing direction relative to the location of a comparison block having the smallest MAD value. In an exemplary implementation, block matching may be used to estimate the photographing direction for taking a panoramic image. Hence, it is sufficient to compute MAD values for those blocks which are located in 'up', 'down', 'left', and 'right' directions around the reference block. Accordingly, the control unit 150 can set the reference block at the center of a first partial image as illustrated in FIG. 2A, and set the comparison blocks on a second partial image in the 'up', 'down', 'left', and 'right' directions around the reference block as illustrated in FIG. 2B.

The input unit 160 includes keys to input numbers and characters, and function keys to set various functions. The function keys can include direction, side and short-cut keys for performing corresponding functions. The input unit 160 includes a key to control the function of the camera unit 120.

The storage unit 170 stores various programs to control the overall operations of the mobile terminal, and various data generated from the operations thereof. In particular, the storage unit 170 can store programs related to panoramic photography.

Upon selection of the panoramic mode through the input unit 160 of the mobile terminal, the control unit 150 activates the camera unit 120, sets the photographing direction using partial images successively input from the camera unit 120, and starts to take a panoramic photograph. In particular, the control unit 150 sets a reference block and comparison blocks on input partial images, computes MAD values of the comparison blocks using pixel brightness values, determines one of the comparison blocks having the smallest MAD value, and determines the photographing direction corresponding to the location of the comparison block having the smallest MAD value.

Figure 3:
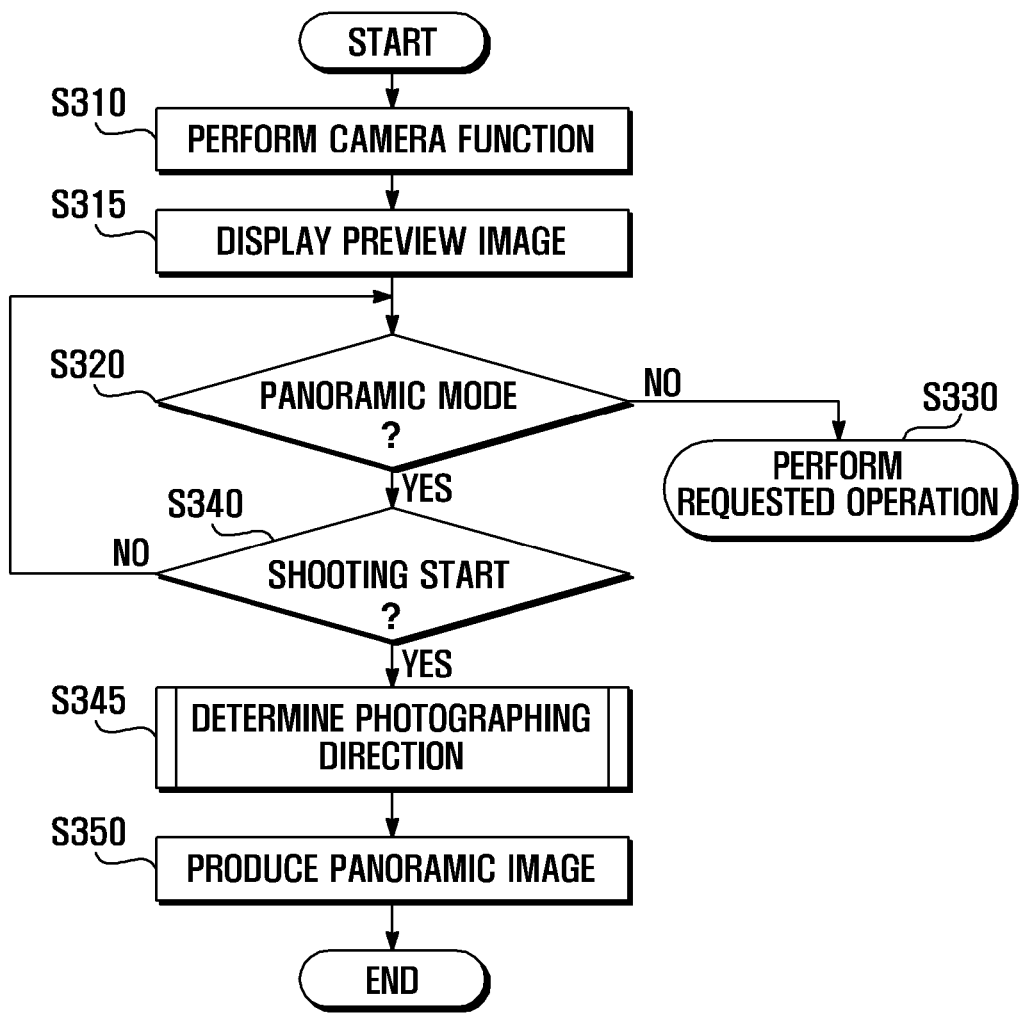
FIG. 3 is a flowchart illustrating a panoramic photographing method according to an exemplary embodiment of the present invention.

FIG. 3 is a flowchart illustrating a method for panoramic photographing according to an exemplary embodiment of the present invention.

Referring to FIG. 3, when the user selects a camera function using a function key of the input unit 160 or a menu, the control unit 150 of the mobile terminal performs the selected camera function in step S310. That is, the control unit 150 activates the camera unit 120. The control unit 150 displays a preview image captured by the camera unit 120 in step S315. The control unit 150 determines whether a request for the panoramic mode is received in step S320. An exemplary embodiment of the present invention provides a means that enables the user to take a panoramic image without setting the photographing direction. That is, the control unit 150 can automatically determine the photographing direction through a comparison between partial images captured by the camera unit 120.

If a request unrelated to the panoramic mode is issued in step S320, the control unit 150 performs the requested operation in step S330. At this step, a photographing operation, such as a capturing of moving images, still images (photographs), composite images, and consecutive images, may be performed. A setting operation may also be performed to set the image resolution or image size.

In contrast, if a request for the panoramic mode is received, the control unit 150 determines whether a shooting start signal is input through the input unit 160 in step S340. A camera key or OK key of the input unit 160 may be used by a user to generate the shooting start signal, which triggers the control unit 150 to start to take a panoramic image.

Figure 4:
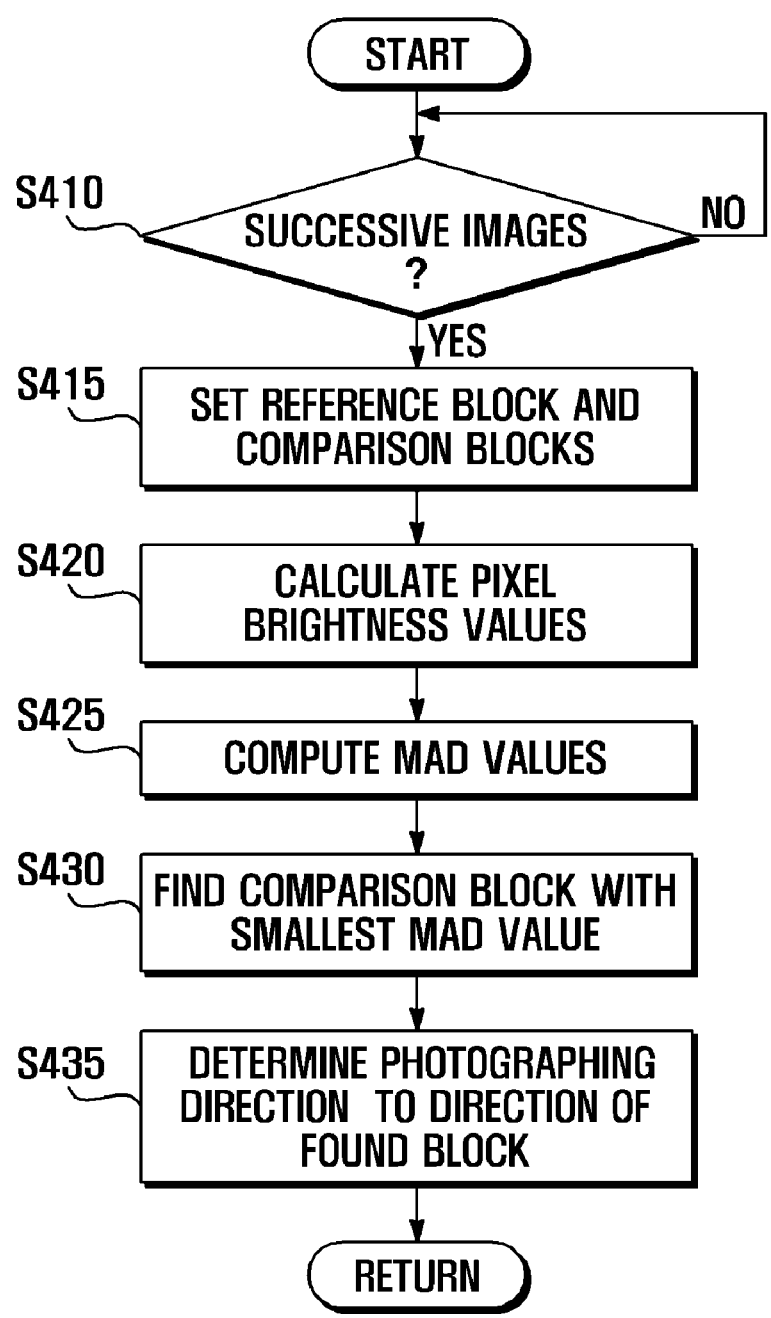
FIG. 4 is a flowchart illustrating a procedure to set a photographing direction in the method of FIG. 3.

To take a panoramic image, the control unit 150 performs a procedure to determine the photographing direction in step S345. The procedure is described in more detail in connection with FIG. 4. FIG. 4 is a flowchart illustrating a procedure to determine the photographing direction according to an exemplary embodiment of the present invention.

Referring to FIG. 4, the control unit 150 determines whether partial images are successively input in step S410. That is, the control unit 150 determines whether partial images are successively captured. If partial images are successively input, the control unit 150 sets a reference block and comparison blocks on the input partial images in step S415. The reference block is set on a first partial image, and has a size of 16×16 pixels (macroblock). The reference block is centered on a point (0, 0) where the x-axis intersects the y-axis, and intersects the x-axis and y-axis at points (−1, 0), (0, −1), (1, 0) and (0, 1). The comparison blocks are set on a second partial image, and locations thereof are set relative to points of the reference block. For example, a comparison block can be centered on a point (1, 0) located in the right-handed direction from the reference block.

The control unit 150 calculates pixel brightness values of the reference block and comparison blocks set on the partial images in step S420. The control unit 150 computes MAD values of the comparison blocks using the pixel brightness values in step S425. Computation of MAD values is described in connection with FIG. 1.

Thereafter, the control unit 150 determines one of the comparison blocks having the smallest MAD value in step S430. The control unit 150 determines the photographing direction with reference to the location of the found comparison block having the smallest MAD value in step S435.

Referring back to FIG. 3, after the determining of the photographing direction, the control unit 150 produces a panoramic image using input partial images in step S350. That is, the control unit 150 joins input partial images together in the photographing direction to produce a panoramic image.

In an exemplary embodiment of the present invention, during a panoramic mode, the control unit 150 can set the photographing direction through a comparison between successively input partial images. That is, the control unit 150 sets a reference block and comparison blocks on input partial images, extracts pixel brightness values of the set blocks, computes MAD values of the comparison blocks using the pixel brightness values, determines one of the comparison blocks having the smallest MAD value, and sets the photographing direction on the basis of the location of the determined comparison block. Accordingly, the user does not have to set the photographing direction before taking a panoramic image.

While the present invention h has been shown and described with reference to certain exemplary embodiments thereof, it should be understood by those skilled in the art that many variations and modifications of the basic inventive concept may be made without departing from the spirit and scope of the invention as defined in the appended claims and their equivalents.

What is claimed is:

1. A panoramic photographing method for a mobile terminal, the method comprising:
    displaying, upon selection of a panoramic mode, a preview image;
    successively capturing, in response to an input of a shooting start signal, a first partial image and second partial image;
    automatically determining a photographing direction in which a camera unit is being panned for taking panoramic image through a comparison between the first partial image and second partial image, wherein the photographing direction is set relative to the location of a comparison block having the smallest Mean Absolute Difference (MAD) value; and
    producing the panoramic image in the determined photographing direction.

2. The method of claim 1, wherein the determining of the photographing direction comprises:
    obtaining brightness values of the first partial image and second partial image;
    computing MAD values using the obtained brightness values; and
    determining a direction according to the computed MAD values.

3. The method of claim 2, wherein the obtaining of the brightness values comprises:
    setting a reference block and comparison blocks on the first partial image and second partial image, respectively; and
    extracting brightness values of pixels constituting the set blocks.

4. The method of claim 3, wherein the setting of the reference block and comparison blocks comprises:
    setting the reference block with reference to an intersecting point of the x-axis and y-axis on the first partial image; and
    setting the comparison blocks on the second partial image in 'up', 'down', 'left', and 'right' directions around the reference block.

5. The method of claim 2, wherein the MAD values are computed using the following equation:

$$MAD(dx, dy) = \frac{1}{mn}\sum_{i=0}^{m}\sum_{j=0}^{n}|F(i, j) - G(i+dx, j+dy)|$$

where mn is the size of the block, F(i,j) denotes brightness values of pixels in the reference block, and G(i+dx, j+dy) denotes brightness values of pixels in comparison blocks.

6. The method of claim 5, wherein the determining of the direction according to the computed MAD values comprises:
    finding a comparison block having the smallest MAD value; and
    determining the photographing direction with reference to a location of the found comparison block.

7. The method of claim 6, wherein the finding of the comparison block having the smallest MAD value comprises using block matching to compute MAD values.

8. The method of claim 2, wherein the determining of the direction according to the computed MAD values comprises:

finding a comparison block having the smallest MAD value; and determining the photographing direction based on the found comparison block.

9. A mobile terminal comprising:

a camera unit for capturing partial images;

a display unit for displaying a panoramic image comprising the captured partial images; and a control unit for controlling, during a panoramic mode, the camera unit to capture a first partial image and a second partial image, for automatically determining a photographing direction in which the camera unit is being panned for taking panoramic image through a comparison between the first partial image and second partial image, for producing the panoramic image in the determined photographing direction, and for controlling the display unit to display the produced panoramic image, wherein the photographing direction is set relative to the location of a comparison block having the smallest Mean Absolute Difference (MAD) value.

10. The mobile terminal of claim 9, wherein the control unit sets a reference block on the first partial image and sets comparison blocks on the second partial image in 'up', 'down', 'left', and 'right' directions around the reference block.

11. The mobile terminal of claim 10, wherein the control unit obtains brightness values of pixels constituting the reference block and comparison blocks and computes MAD values using the obtained brightness values.

12. The mobile terminal of claim 11, wherein the control unit finds a comparison block having a smallest MAD value.

13. The mobile terminal of claim 12, wherein the control unit sets the photographing direction with reference to the comparison block having the smallest MAD value.

14. The mobile terminal of claim 9, wherein the control unit comprises a Mean Absolute Difference (MAD) calculator for calculating MAD values using brightness values of pixels of the first partial image and the second partial image.

15. The mobile terminal of claim 14, wherein the MAD calculator uses block matching to compute the MAD values.

16. The method of claim 8, wherein the finding of the comparison block comprises using block matching to compute MAD values.

* * * * *